(12) United States Patent
Matsumoto

(10) Patent No.: US 7,594,173 B2
(45) Date of Patent: *Sep. 22, 2009

(54) DOCUMENT CONTROL APPARATUS, DOCUMENT CONTROL SYSTEM, DOCUMENT CONTROL METHOD AND STORAGE MEDIUM

(75) Inventor: Naoyuki Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 547 days.

This patent is subject to a terminal disclaimer.

(21) Appl. No.: 11/153,373

(22) Filed: Jun. 16, 2005

(65) Prior Publication Data

US 2005/0235204 A1 Oct. 20, 2005

Related U.S. Application Data

(62) Division of application No. 09/725,034, filed on Nov. 29, 2000, now Pat. No. 6,948,122.

(30) Foreign Application Priority Data

Nov. 30, 1999 (JP) ................................. 11-340081
Nov. 22, 2000 (JP) ............................. 2000-356559

(51) Int. Cl.
*G06F 17/00* (2006.01)
(52) U.S. Cl. ...................... 715/255; 715/200; 715/256
(58) Field of Classification Search ......... 715/255–256, 715/272, 200, 229, 500, 530, 271, 531
See application file for complete search history.

(56) References Cited

U.S. PATENT DOCUMENTS

| | | | |
|---|---|---|---|
| 5,504,897 A | 4/1996 | Gans et al. ............... | 707/104.1 |
| 5,761,497 A | 6/1998 | Holt et al. ...................... | 707/5 |
| 5,848,397 A | 12/1998 | Marsh et al. ................... | 705/14 |
| 5,864,871 A | 1/1999 | Kitain et al. .............. | 707/104.1 |
| 5,873,100 A * | 2/1999 | Adams et al. ................ | 707/204 |
| 5,917,912 A | 6/1999 | Ginter et al. ................. | 713/187 |
| 6,009,409 A | 12/1999 | Adler et al. .................... | 705/14 |
| 6,032,150 A | 2/2000 | Nguyen ...................... | 707/102 |
| 6,038,601 A | 3/2000 | Lambert et al. ............. | 709/226 |
| 6,081,810 A * | 6/2000 | Rosenzweig et al. ...... | 707/104.1 |
| 6,108,703 A | 8/2000 | Leighton et al. ............ | 709/226 |
| 6,204,774 B1 * | 3/2001 | Miwa et al. .................. | 340/5.2 |
| 6,240,401 B1 * | 5/2001 | Oren et al. ..................... | 705/40 |
| 6,249,807 B1 | 6/2001 | Shaw et al. ................. | 709/206 |
| 6,256,633 B1 | 7/2001 | Dharap ........................ | 707/10 |
| 6,314,409 B2 | 11/2001 | Schneck et al. ............... | 705/54 |

(Continued)

*Primary Examiner*—Thu Huynh
(74) *Attorney, Agent, or Firm*—Fitzpatrick, Cella, Harper & Scinto

(57) ABSTRACT

To provide a document control apparatus, a document control system, a document control method and a storage medium that are capable of providing more certain access control by the unit of document and a system (service) for allowing access in the form of charging additional charge with a fixed grace period, and are capable of supporting more flexible and certain storing service. The document control system includes a Web server, a session control part for controlling access, a job control part for controlling job execution, a document registration processing part for registering, updating and deleting a document, a document search processing part for searching an accumulated and controlled document, a document transfer processing part for transmitting and receiving document data, a user control part for controlling user information, a database control part for controlling document data, registration user, charge information and document access histories, and databases.

13 Claims, 9 Drawing Sheets

U.S. PATENT DOCUMENTS

| | | | |
|---|---|---|---|
| 6,599,324 B2 | 7/2003 | Saito et al. | 715/513 |
| 6,625,734 B1 | 9/2003 | Marvit et al. | 713/201 |
| 7,124,094 B1 * | 10/2006 | Kobayashi et al. | 705/26 |
| 7,133,845 B1 * | 11/2006 | Ginter et al. | 705/51 |
| 2002/0018241 A1 * | 2/2002 | Brewster | 358/402 |
| 2005/0235204 A1 * | 10/2005 | Matsumoto | 715/539 |

* cited by examiner

FIG. 11

| FUNDAMENTAL CONTRACT (YEAR) | CHARGE FOR STORING (YEN/MONTH·DOC.) | ACCESS CHARGE FOR SPECIAL RANGE (YEN/TIME) |
|---|---|---|
| 1 | 1 | 200 |
| 5 | 4 | |
| 10 | 7 | |
| 15 | 10 | |
| 20 | 13 | |

FIG. 12

| USER ID | DOCUMENT CONTROL NUMBER | REGISTRATION MONTH | UPDATE MONTH | FUNDAMENTAL CONTRACT (YEAR) | ACCESS FREQUENCY | SPECIAL RANGE | ADDITIONAL CHARGE |
|---|---|---|---|---|---|---|---|
| T00001 | A00000001 | 97.1 | 99.1 | 1 | A | YES | 1000 |
| | A00000002 | 98.1 | 99.1 | 1 | | | |
| | A00000006 | 98.1 | 99.1 | 5 | A | | |
| | A00000007 | 98.1 | 99.1 | 5 | | | |
| | A00000008 | 98.1 | | 10 | | | |
| | A00000010 | 98.1 | | 10 | | | |
| | A00000011 | 99.1 | | 10 | | | |
| | A00000012 | 99.1 | | 15 | | | |
| | A00000013 | 99.2 | | 15 | | | |
| T00002 | A00000010 | 99.1 | | 5 | A | | |
| | A00000011 | 99.9 | | 5 | | | |
| ...... | ...... | | | | | | ...... |

DOCUMENT CONTROL APPARATUS, DOCUMENT CONTROL SYSTEM, DOCUMENT CONTROL METHOD AND STORAGE MEDIUM

This application is a division of application Ser. No. 09/725,034, filed Nov. 29, 2000 (pending).

BACKGROUND OF THE INVENTION

1. Field of the Invention

The present invention relates to a document control apparatus, a document control system, a document control method and a storage medium, more particularly to a document control apparatus, a document control system, a document control method and a storage medium that are preferable for providing accumulation control service by keeping various users' electronic documents.

2. Related Background Art

Conventionally, companies have been providing document control systems for controlling electronic documents in an office. However, a conventional system generally is a sort of a document control system exclusively used by a user that is established in the user side in order to control documents owned by the user. In addition, since such a system is relatively expensive, although its introduction effects are expected and installation is proceeded to some extent according to necessity in large companies, it has not been introduced in small and medium-sized companies yet. On the other hand, it is an important subject for clarifying responsibilities of a company to store and control documents for a fixed period of time in the company. Thus, a service for storing and controlling documents of companies is now being started as a business.

However, the above-mentioned conventional art has the following problems. When a service for storing and controlling documents of companies is being started as a business as described above, a document control system for keeping documents of other companies with responsibility needs to be established unlike a conventional system that is exclusively operated within an own company. For this purpose, measures from various points of view are required, and here, a mechanism of a basic charge system in implementing a service and subjects particularly concerning storing duration of user documents and charge control are dealt with by the present invention.

The present invention is devised in view of the above-mentioned points, and it is an object of the present invention to provide a document control apparatus, a document control system, a document control method and a storage medium that are capable of providing more certain access control by the unit of document and a system (service) for allowing access in the form of charging additional charge with a fixed grace period, and are made possible to support more flexible and certain than before.

SUMMARY OF THE INVENTION

In one embodiment of the present invention, a document control apparatus for accumulating and controlling electronic documents while keeping them accessible from outside is provided which comprises: duration controlling means for storing document control duration information by the unit of an electronic document when registering a document; access prohibiting means for prohibiting an access from outside to an electronic document whose document control duration has expired; and duration updating means for updating the document control duration by the unit of an electronic document.

BRIEF DESCRIPTION OF THE DRAWINGS

FIG. 11 shows an example of a charge unit value table in accordance with the embodiment of the present invention; and FIG. 12 shows an example of charge control information in accordance with the embodiment of the present invention.

DESCRIPTION OF THE PREFERRED EMBODIMENT

An embodiment of the present invention will be hereinafter described in detail with reference to the drawings.

Figure 2:
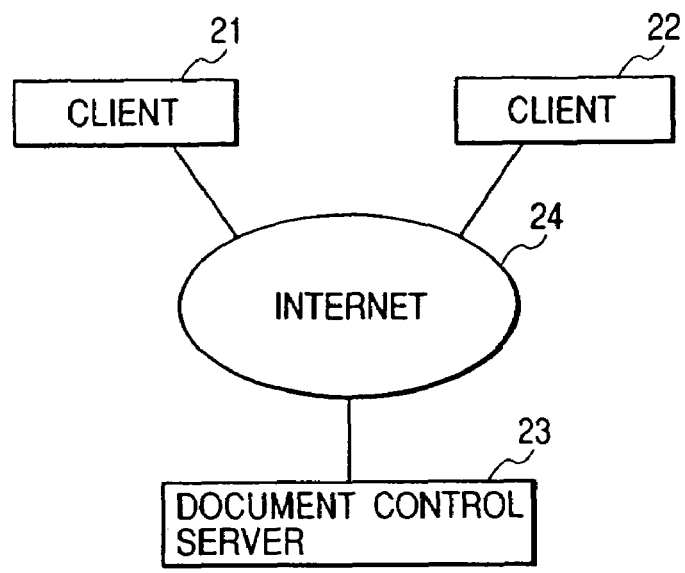
FIG. 2 is a conceptual illustration showing a configuration of the document control system in accordance with the embodiment of the present invention.

FIG. 2 is a conceptual illustration showing a configuration of a document control (document distribution system) in accordance with the embodiment of the present invention. The document control system in accordance with the embodiment of the present invention has a configuration in which a plurality of clients 21 and 22, and a document control server 23 are connected via the Internet 24. Further, the configuration shown in FIG. 2 is an example only, and the number of clients and the like are not limited by the illustrated configuration.

Describing the above-mentioned configuration, in the document control system, the plurality of clients (in this example, the clients 21 and 22) are made to be capable of accessing the document control server 23 via the Internet 24. Each of the clients 21 and 22 is made to be capable of performing registration, search, draw-out and so forth of documents and these operations can be performed from a Web browser. A configuration of the document control server 23 will be described later with reference to FIG. 1.

Figure 3:
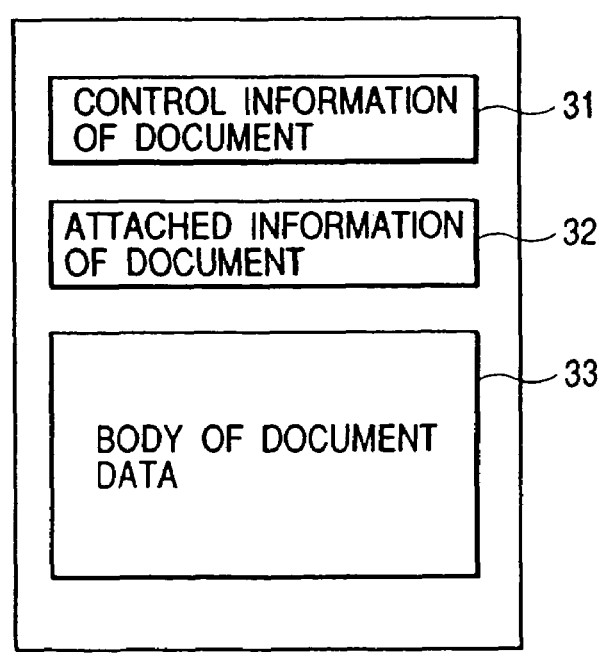
FIG. 3 is an explanatory illustration of a configuration of a document format in accordance with the embodiment of the present invention.

FIG. 3 is an explanatory illustration showing a configuration of a document format in accordance with the embodiment of the present invention. In FIG. 3, the document format is shown as controlling various kinds of information and data that are important in controlling documents as one set of documents and is composed of control information of document 31, attached information of document 32 and a body of document data 33.

First, in the area of the control information of document 31, information such as an owner of each document, a storing duration under contract, an access authority holder of a document, a control number, a document name (title) is set. Second, in the area of the attached information of document 32, summary information of a document, index (keyword) information and the like are set. In some cases, processed body of document data 33, Optical character Reader (OCR) analyzed original image data, for example, imaged code data (data prepared by various kinds of document preparation applications) are combined to be set. Third, the body of document data 33 is requested to be registered by a user. In addition, it is also possible, by accumulating and storing an entity of each data in physically different storing places, to alternatively set link information indicating the place where the entity of the data exists in this information area.

Figure 1:
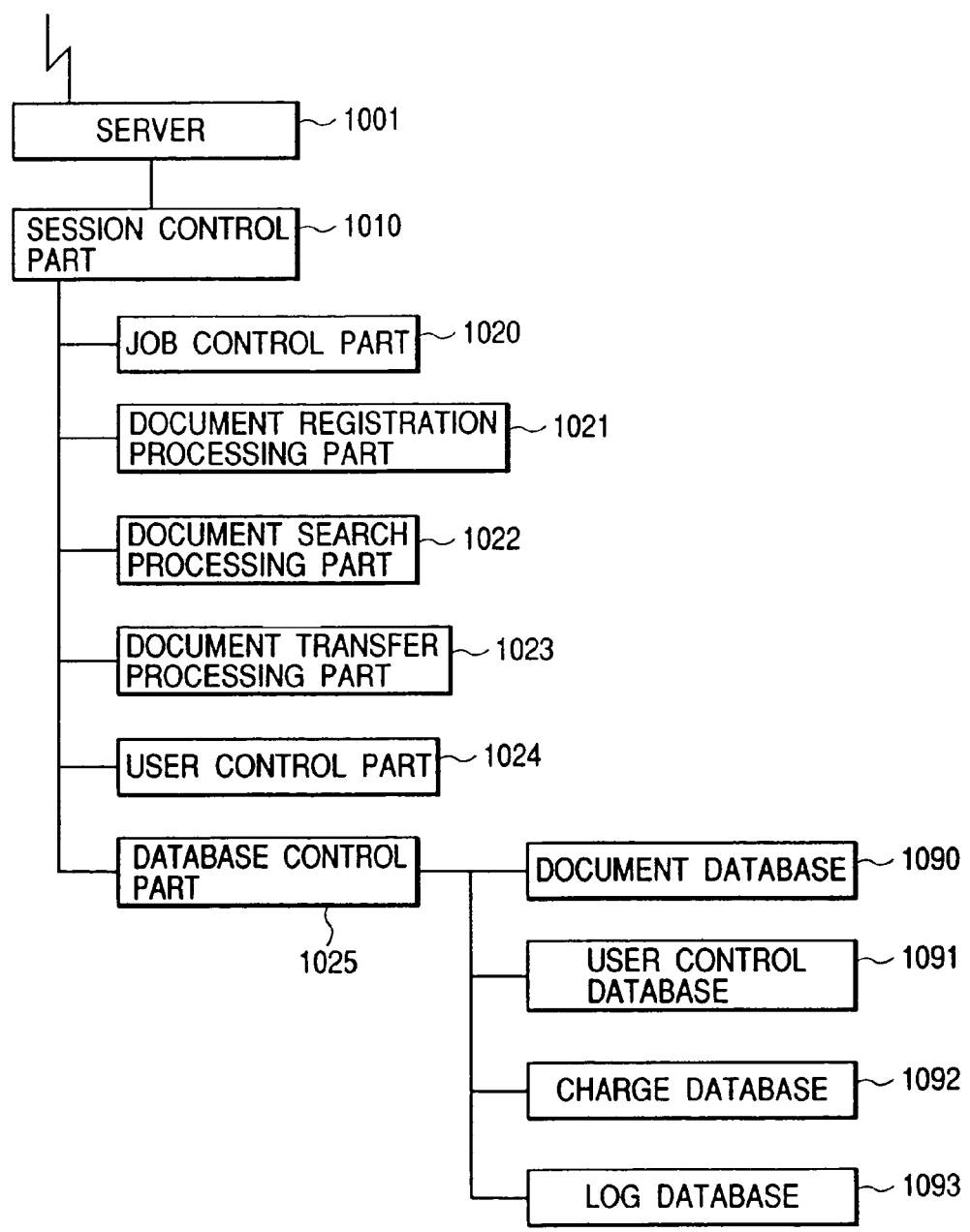
FIG. 1 is a block diagram showing a configuration of a document control server of a document control system in accordance with an embodiment of the present invention.

FIG. 1 is a block diagram showing a configuration of a document control (document distribution) server of the document control system in accordance with this embodiment of the present invention. The document control (document distribution) server of the document control system in accordance with this embodiment of the present invention has a configuration in which a Web (HTTP: Hyper Text Transfer Protocol) server 1001, a session control part 1010, a job control part 1020, a document registration processing part 1021, a document search processing part 1022, a document transfer processing part 1023, a user control part 1024, a database control part 1025, a document database 1090, a user control database 1091, a charge database 1092 and log database 1093 are provided.

Describing the above-mentioned configuration in detail, the Web server 1001 has a Web browser and an interface. The session control part 1010 through the database control part 1025 execute processing shown in flowcharts of FIGS. 4 through 8 that will be described later. The session control part 1010 has the Web server 1001 and an interface, and controls an access (session) from each user. The job control part 1020 controls execution of a user job. The document registration processing part 1021 performs processing such as registration, update, deletion of a document. The document search processing part 1022 performs search processing of documents accumulated and controlled in the Web server 1001.

The document transfer processing part 1023 performs processing of transmission and reception document data with the user side. The user control part 1024 controls user information to be registered for service. The database control part 1025 controls various kinds of data to be described below by the document database 1090 through the log database 1093. The document database 1090 controls document data. The user control database 1091 controls registered users. The charge database 1092 controls charge information. The log database 1093 controls document access histories.

A control method of charge information in the present invention will now be described with reference to FIGS. 11 and 12.

FIG. 11 is a table defining charge units to be used for calculating a charge. Unit prices by the unit of a document and a month are defined in accordance with basic contract terms. In addition, as will be described later, since a mechanism is provided to store a document with high access performance for a fixed time of period after the expiration of an contract, a special charge unit price for accessing such a document is also defined.

FIG. 12 shows examples of charge control data prepared for control charges. The examples are as follows.

User ID

Basically, an ID is given to each user so that charge for each user can be controlled.

Document Control Number

Here, an ID is added by the unit of a registered document so that charge is controlled per the unit of a document.

Registration Month

Here, date and time when a document first registered are controlled by the unit of a month.

Update Month

The latest contract update month is controlled.

Fundamental Contract

The latest contract period is controlled.

Access Frequency

Find access frequency from an access log with respect to each document to be separately controlled, and select and control (mark) a document with high access frequency. The document marked here is kept for a fixed time of period (a special range) even after the contract period has expired, and made accessible with an addition of additional charge for the special range defined in FIG. 11. In addition, the document marked here can be utilized for presenting it as a document for which contract update is recommended.

Special Range

As described above, this is a field for controlling that a document is an object of control falling into the special range even if its basic contract period has expired.

Additional Charge

Total of unsettled access charge with respect to the document controlled in the special range.

By controlling such data, charges that should be settled are calculated.

Here, it is assumed that a form of settlement, a month of settlement are controlled by the user control DB separately.

Figure 10:
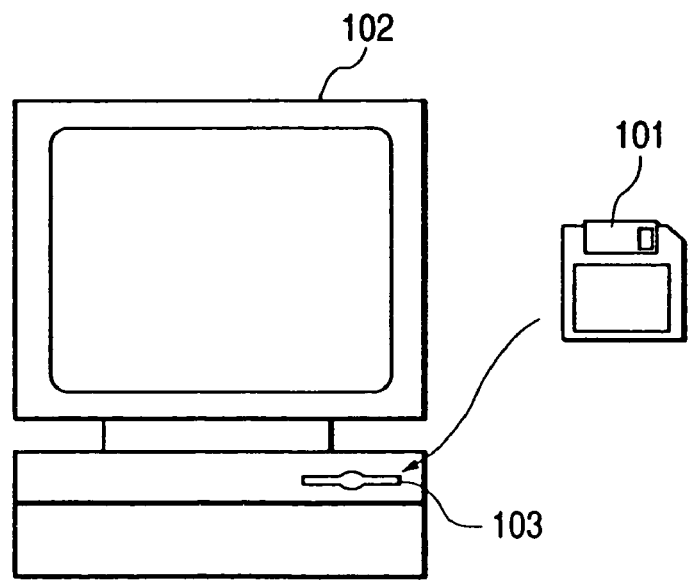
FIG. 10 is an explanatory illustration showing a conceptual example of the program and the related data of the present invention being supplied from the storage medium to an apparatus.

FIG. 10 is an explanatory illustration showing a conceptual example of the program and the related data of the present invention being supplied from a storage medium to an apparatus. The program and the related data of the present invention are supplied by inserting a storage medium 101 such as a floppy disc and a CD-ROM in a storage medium drive inserting opening 103 provided in an apparatus 102. Thereafter, the program and the related data of the present invention can be executed by loading them from a hard disc to an RAM after installing them in the hard disc once from the storage medium 101, or loading them directly to the RAM without installing them in the hard disc.

In this case, if the program of the present invention is executed in the document control system in accordance with the embodiment of the present invention, the program can be executed by supplying the program and the related data of the present invention in the document control server of the document control system in the procedures, for example, shown in the above-mentioned FIG. 10, or by storing the program and the related data of the present invention in the document control server in advance.

Figure 8:
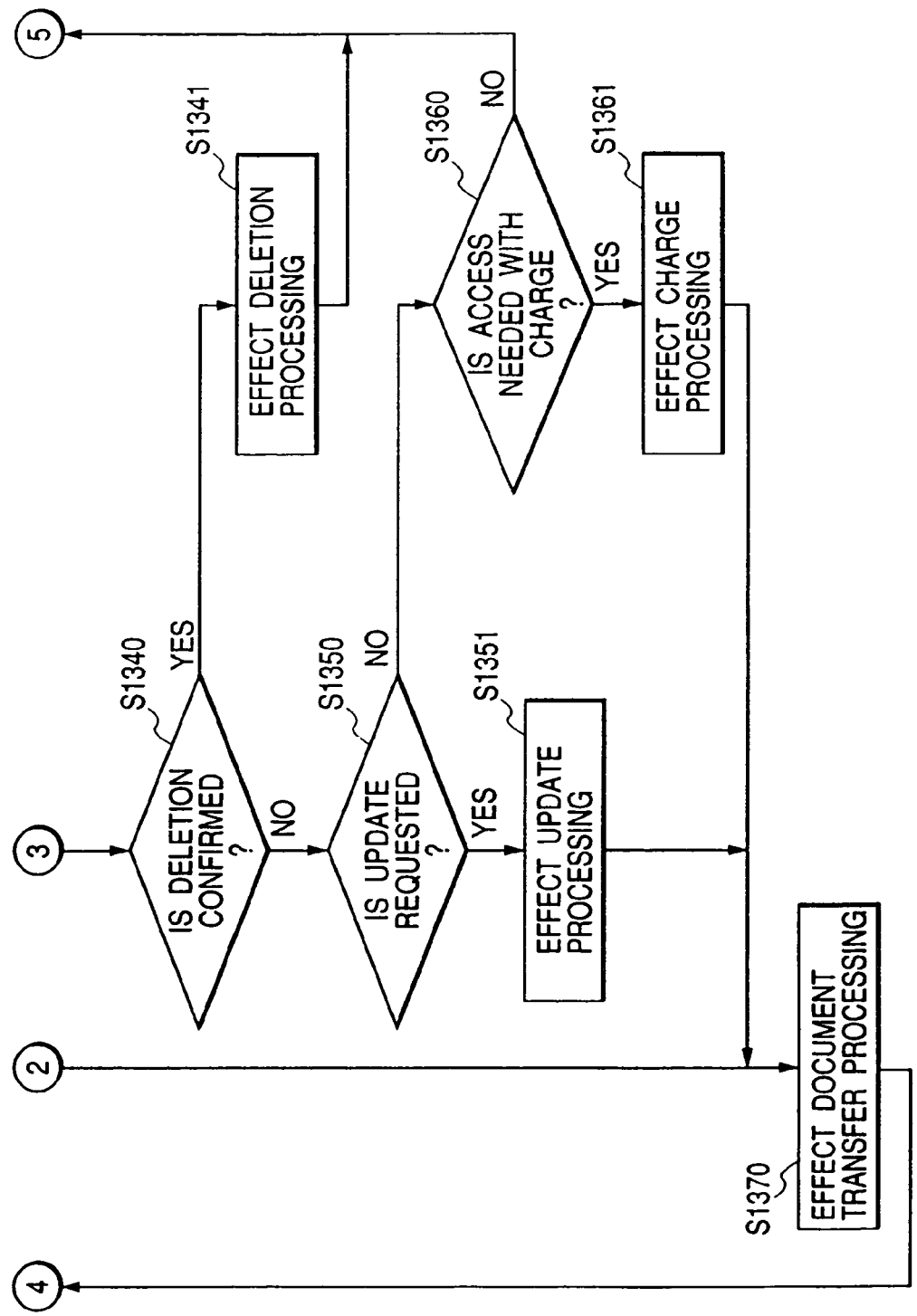
FIG. 8 is a flow chart showing document access processing in accordance with the embodiment of the present invention.
Figure 9:
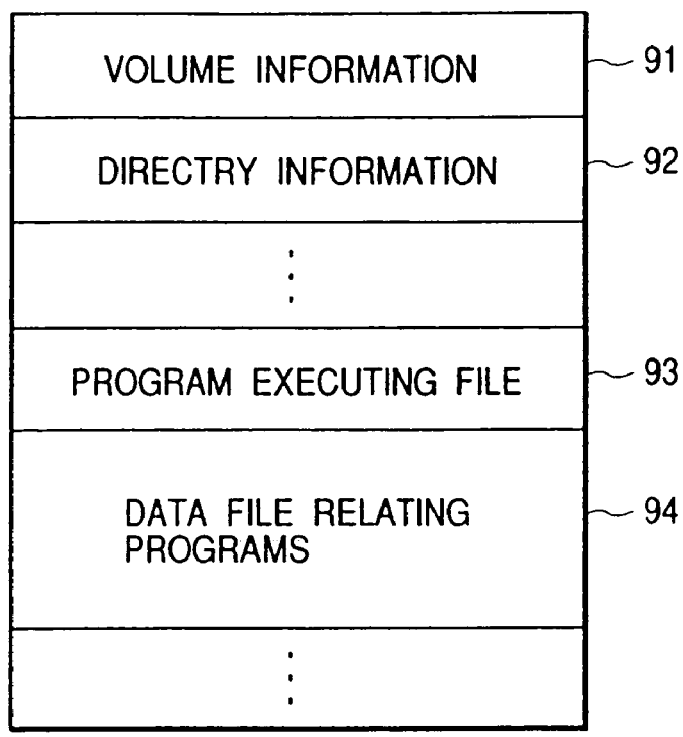
FIG. 9 is an explanatory illustration showing an configuration example of stored contents of a storage medium storing a program and related data of the present invention.

FIG. 9 is an explanatory illustration showing a configuration example of stored contents of the storage medium storing the program and the related data of the present invention. The storage medium of the present invention is composed of the stored contents, for example, volume information 91, directory information 92, a program execution file 93, a program related data file 94 and the like. The program of the present invention is a program coded based on flowcharts of FIGS. 4 through 8 to be described later.

Further, association between each element in claims of the present invention and each part of the document control system in accordance with the embodiment of the present invention is as described below. A document control apparatus corresponds to the document control server and an external apparatus corresponds to the client. In addition, period controlling means, period updating means and document registering means correspond to the document registration processing part 1021, access prohibiting means corresponds to the user control part 1024, document searching means corresponds to the document search processing part 1022, document transferring means correspond to the document transfer processing part 1023, charging means corresponds to the database control part 1025 and the charge database 1029, document accumulating means corresponds to the document database 1090, user accumulating means corresponds to the user control database 1091, charge accumulating means corresponds to the charge database 1092, and history accumulating means corresponds to the log database 1093.

Basic processing, document registration/update/deletion processing and document access processing of the document control server of the document control system with reference to the embodiment of the present invention configured as described above will now be described in detail with reference to the flowcharts of FIGS. 4 through 8.

<Basic Processing of the Document Control Server>

Figure 4:
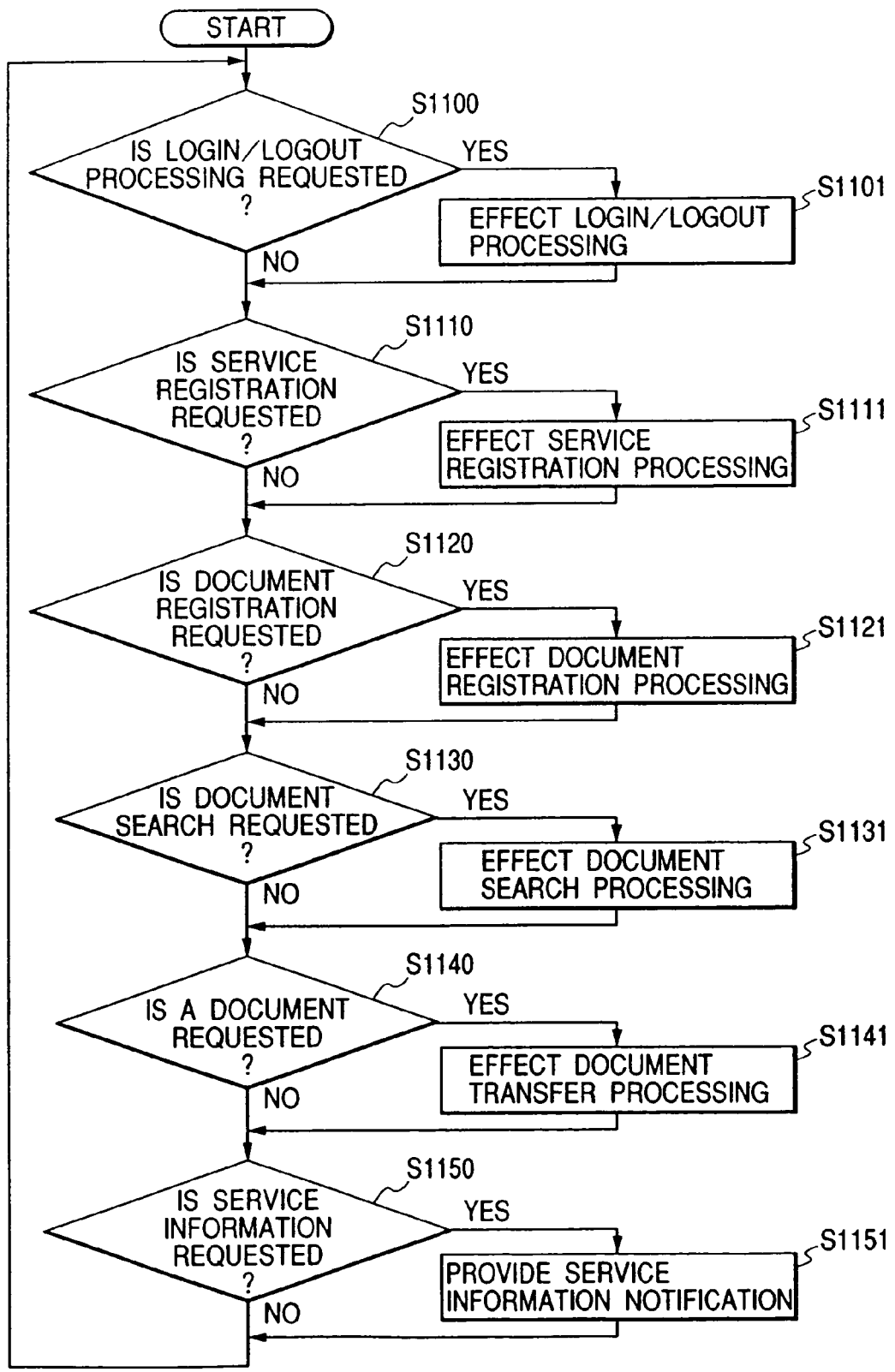
FIG. 4 is a flow chart showing basic processing of the document control server in accordance with the embodiment of the present invention.

FIG. 4 is a flowchart showing the basic processing of the document control server in accordance with the embodiment of the present invention. In step S1100, the user control part 1024 determines whether Login/Logout processing is requested, and if the Login/Logout processing is requested, effects the Login/Logout processing in step S1101. Particularly, at the time of the Login processing, the user control part 1024 refers to the user control database 1091 via the database control part 1025, and also determines whether a registered user of the service makes the request. In step S1110, the user control part 1024 determines whether service registration is requested, and if the service registration is requested, effects service registration in step S1111. Here, a new user is registered after collecting predetermined information and, at the same time, contents of the user registration are updated or deleted, and contents of the user control database 1091 are updated via the database control part 1025.

In step S1120, the document registration processing part 1021 determines whether document registration is requested, and if the document registration is requested, the document registration processing is performed in step S1121. Here, the document data is transferred, a new document is registered, update of the control information of registered document and deletion of a document are simultaneously performed, and contents of the document database 1090 are updated via the database control part 1025. In step S1130, the document search processing part 1022 determines whether document search is requested, and if the document search is requested, document search processing is performed in step S1131. As means for searching a document, various methods such as keyword search, full text search and the like can be contemplated, but no specific reference is made to the means here. Further, search with the document control information set in the document itself can be easily realized and, for example, search limited to remaining duration of the storage control duration for an owner is also possible.

In step S1140, the document transfer processing part 1023 determines whether a document is requested and, if the document is requested, document transfer processing is performed in step S1141. Here, transferring an entity of document data requested by a user to be transferred is a basis, but data that is additionally processed (OCR analysis results, etc.) may be transferred. In step S1150, the user control part 1024 determines whether service information is requested and, if the service information is requested, a service information notification is provided in step S1151. For example, the number of registered documents for each user, charge information, access information of a registered document can be notified.

<Document Registration/Update/Deletion Processing>

Figure 5:
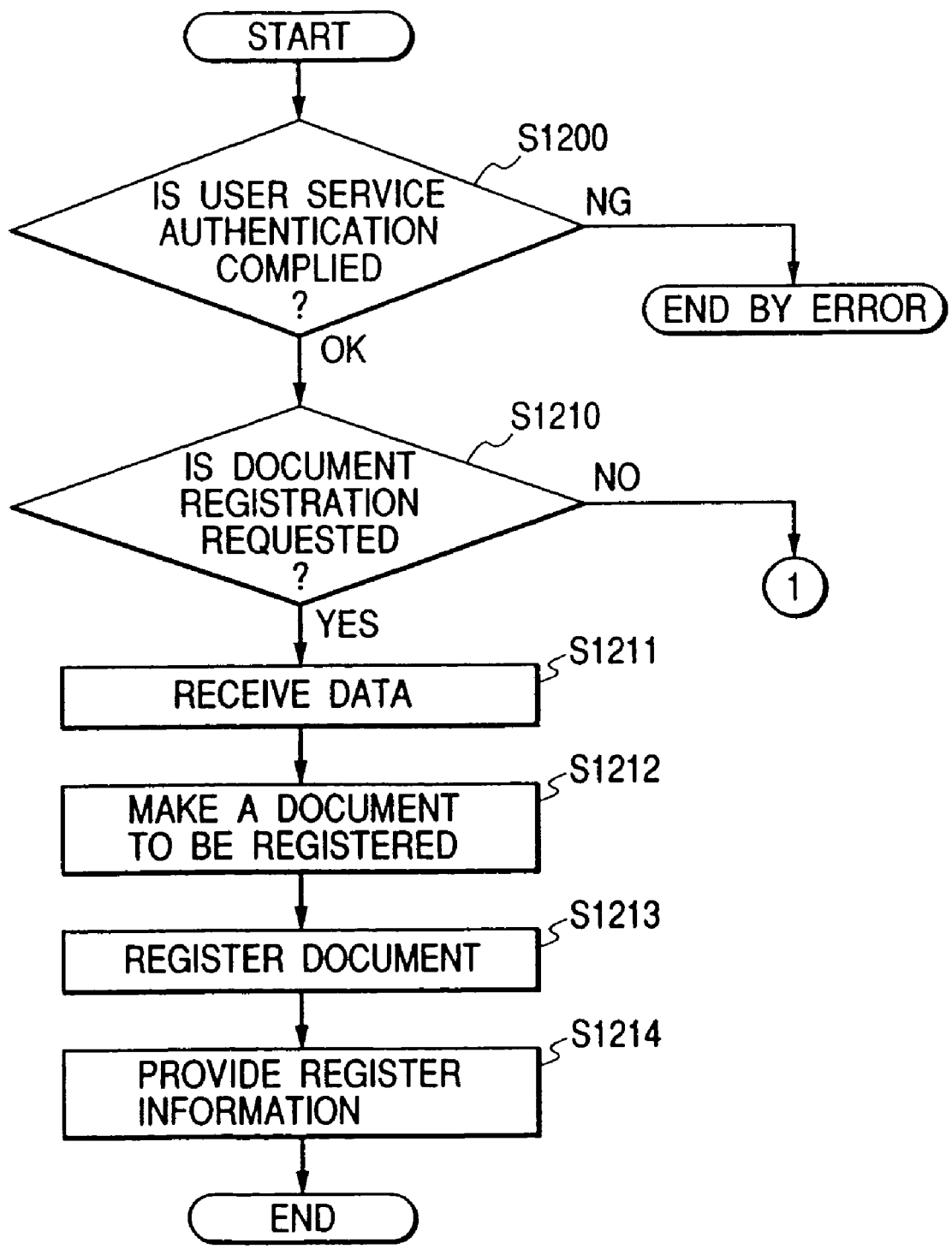
FIG. 5 is a flow chart showing document registration/update/deletion processing in accordance with the embodiment of the present invention.
Figure 6:
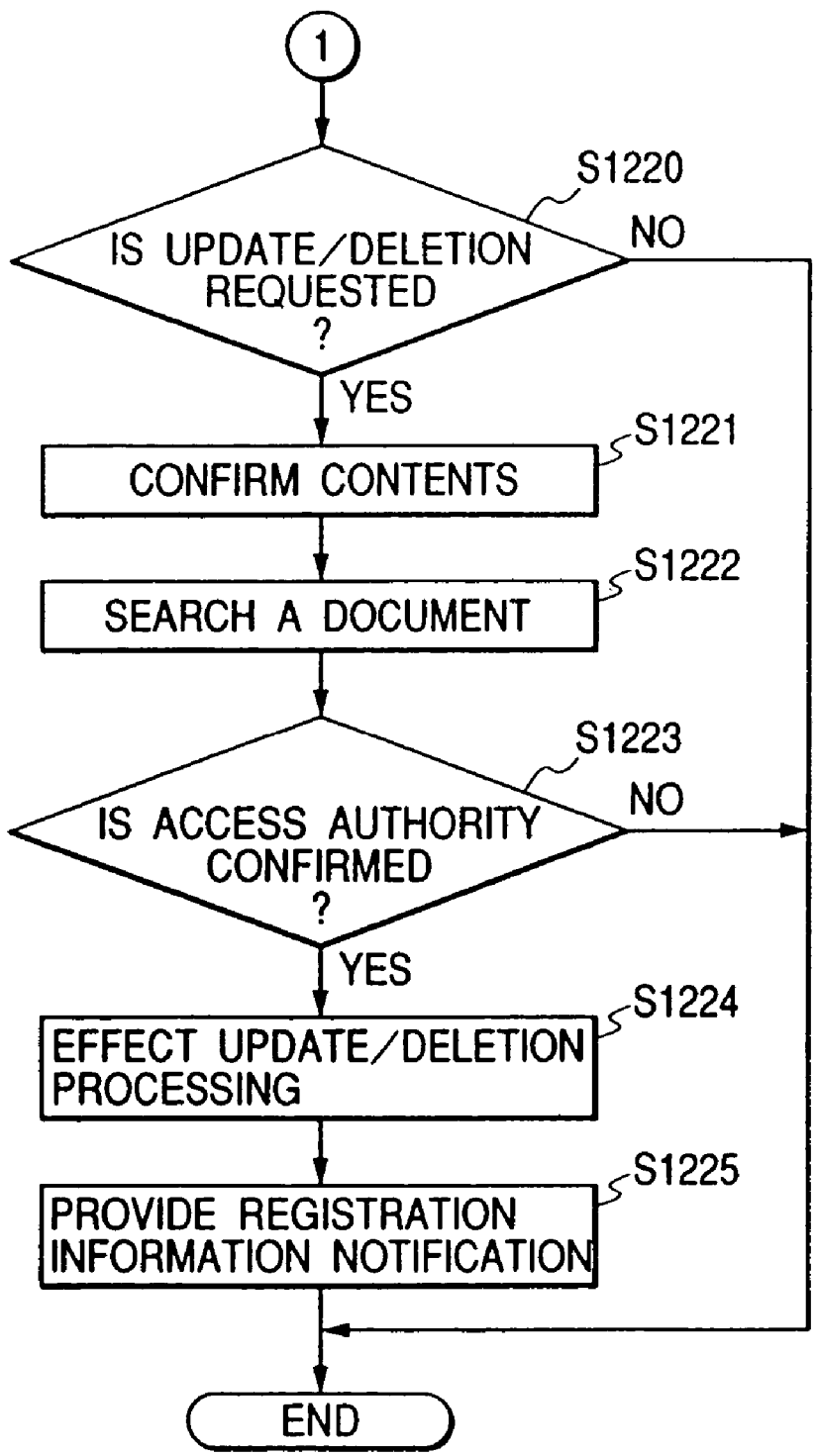
FIG. 6 is a flow chart showing document registration/update/deletion processing in accordance with the embodiment of the present invention.

FIGS. 5 and 6 are flowcharts showing the document registration/update/deletion processing in accordance with the embodiment of the present invention. In step S1200, the user control part 1024 performs user authentication first. In the case of an unregistered user, the user control part 1024 notifies to this effect and ends the processing by error. In step S1210, the user control part 1024 determines whether new document registration is requested or not and, if the new document registration is requested, goes to registration processing, and if the new document registration is not requested, goes to update/deletion processing. If the document registration is requested in the above-mentioned step S1210, document data that should be registered is received by the document transfer processing part 1023 in step S1211. At this time, data that is required for registration control is also obtained.

In step S1212, the document registration processing part 1021 prepares a document for registration in the format shown in the above-mentioned FIG. 3. The document control information required for control which is obtained in the above-mentioned step S1211 is set in this step S1212. In addition, if a request for a job such as OCR analysis processing is made, data may be set by performing processing at this stage, or the request may be received at the time of update request and processed. In step S1213, the document prepared by the document registration processing part 1021 is registered in the document database 1090. In step S1214, the user control part 1024 notifies the user of the registered information (a registration number, etc.), and ends the registration request processing.

If it is determined in step S1210 that the document registration request is not made, in step S1220, the user control part 1024 confirms whether an update request/an deletion request is made. In step S1221, the user control part 1024 confirms the difference of an update registration/a deletion request as well as a document number to be an object, and in step S1222, the document search processing part 1022 searches the document. In step S1223, the user control part 1024 confirms whether the request is from a user who is allowed to make an update or deletion request based on the access information set in the document and, if the request is from a user who is not allowed to make a request, notifies that the user has no access authority and ends the processing.

The access authority information described here is a user name, but it may be something like an access password. In addition, for the system control, although it is possible to control the access authority only by generally used document registration table and the like, the access authority is more certainly controlled by using both information of the control table and information set in document information in this embodiment. Further, information recorded on the control tale is information that is prepared supplementary for the increase of access efficiency, and information that is original is information that is set in a document.

If it is determined in the above-mentioned step S1223 that the user has an access authority, in step S1224, the document registration processing section 1021 actually performs update processing or deletion processing of document information.

In the update processing, not only update of control information such as update of storing duration but also additional processing and the like of additional information prepared from the original document is accepted. In step S1225, the user control part 1024 notifies results of the processing performed in the above-mentioned step S1224, and ends the update/deletion processing.

<Document Access Processing>

Figure 7:
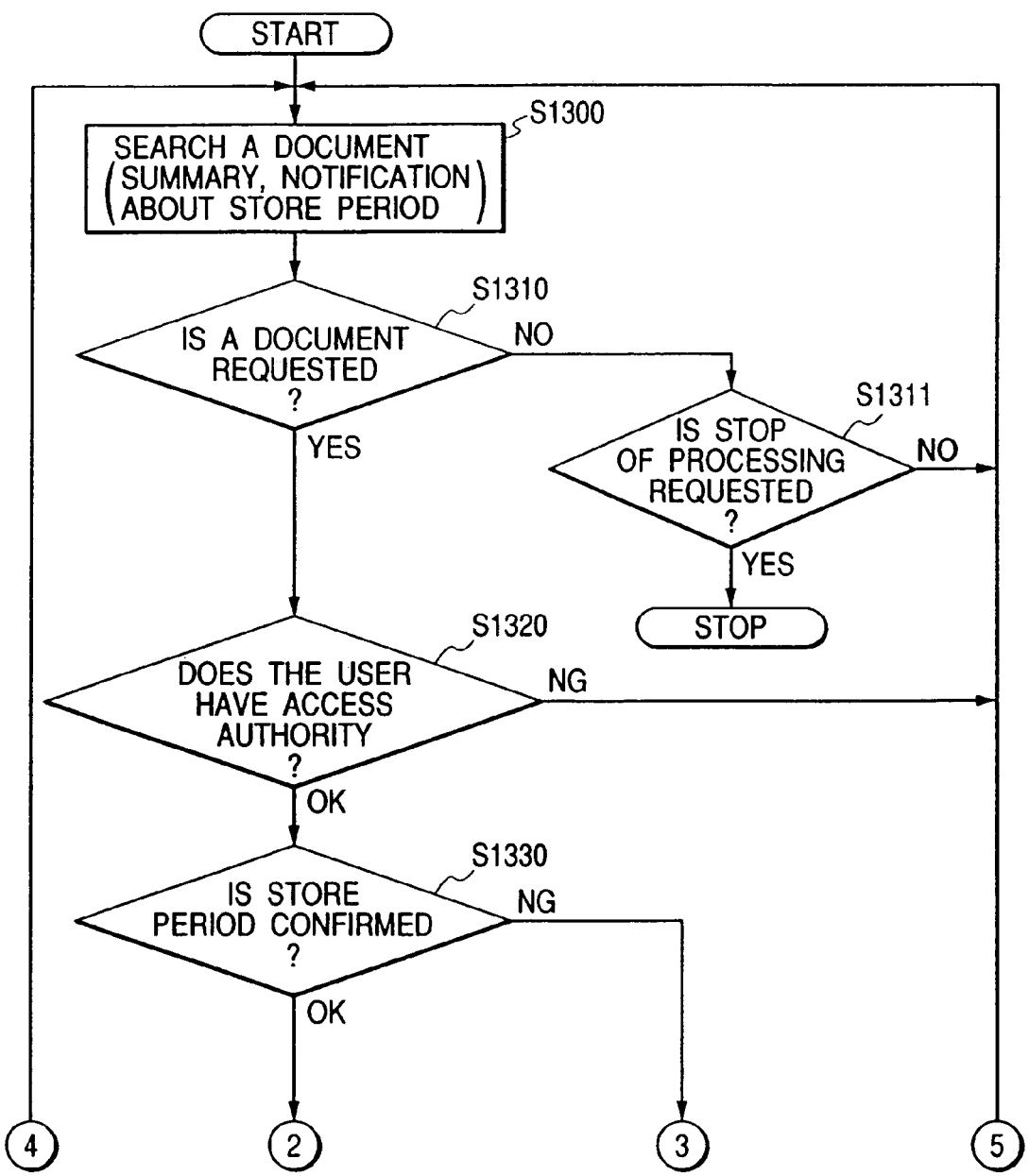
FIG. 7 is a flow chart showing document access processing in accordance with the embodiment of the present invention.

FIGS. 7 and 8 are flowcharts showing document access processing in accordance with the embodiment of the present invention. In step S1300, the document search processing part 1022 searches a document first. An object scope of the search is preliminary limited to accessible documents in a group to which a user belongs (for example, an entire document controlled in a specific department of a company). In addition, an access authority is not specifically set in information such as a summary and the like, and all users in a group are set to be allowed to inspect. Thus, a user can confirm an outline of a document that is limited by keyword search and so forth by summary information and the like. Here, storing period information of the document is notified to the user together with the summary information for the user's reference. In addition, concerning this notification of storing period information, there is selecting means for limiting the notification to be made only in a case in which remaining duration becomes shorter than a fixed duration.

Step S1310 is confirmation processing of document request after ending a search. If a document is not requested, ending of the processing is confirmed in step S1311, and the processing is returned to the search processing or ends the document request processing based on confirmation results. A document request in this context means a request of data of a body of a document made by a user if only a summary is insufficient information. If a document is requested, the user control part 1024 first confirms a setting state of an access authority that can be set in a document itself and confirms whether the user has an access authority or not in step S1320. If the user does not have an access authority, the processing returns to the search processing. If the user has an access authority, the user control part 1024 confirms setting contents of a storing control duration set in the document in step S1330. If there is no problem, the document transfer processing part 1023 performs transfer processing of predetermined data in step S1370, and the processing returns to the document search processing.

Step S1340 is a step for deletion confirmation, and if a regular storing period has expired, the document registration processing part 1021 confirms if the document may be deleted. If the document may be deleted, the document registration processing part 1021 deletes the document in step S1341, and the processing returns to the document search processing. Step S1350 is a step for update confirmation, and if a regular storing period has expired, the document registration processing part 1021 confirms if the storing duration of the document may be extended. If the storing period of the document may be extended, the document registration processing part 1021 updates the document in step S1351, and the processing goes to the document transfer processing. Step S1360 is a step for confirming charge access, and the user control part 1024 confirms if a user accesses a document that is temporarily stored although its regular storing duration has been expired with an additional charge, and if there is no access request, the process returns to the document search processing. If there is an access request, the database control part 1025 and the charge database 1092 perform charge control processing in step S1361, and the processing goes to the document transfer processing.

Charge processing in this context means adding a predetermined charge amount to the field of additional charge described above and shown in FIG. 12.

Here, an explanation is supplemented for a case in which a document is controlled even if a regular storing duration has expired. This assumes a case in which, for example, most frequently accessed document is provided with storing service with a special charge system that is different from a regular charge for a fixed time of period and for a fixed volume as an option of the service supplier side.

The charge system is as described above and shown in FIG. 11.

As described above, according to the document control system in accordance with the embodiment of the present invention, since the document control sever comprises: the Web server 1001 having the Web browser and the interface; the session control part 1010 having the Web server 1001 and the interface for controlling access from each user; the job control part 1020 for executing and controlling a user job; the document registration processing part 1021 for processing registration, update, deletion and the like of documents; the document search processing part 1022 for searching a document accumulated and controlled in the Web server 1001; the document transfer processing part 1023 for processing transmission and reception of document data with the user side; the user control part 1024 for controlling user information to be registered for service; the database control part 1025 for controlling document data, registered users, charge information and document access histories; and databases 1090 through 1093 for accumulating document data, registered users, charge information and document access histories respectively, it has the following operations and effects.

In the above-mentioned configuration, if a document registration request is issued, the document registration processing part 1021 performs document data transfer processing, new document registration, update of control information of a registered document, and document deletion processing, and updates contents of the document database 1090. In this case, as shown in FIG. 3, the document registration processing part 1021 controls the control information of document 31, the attached information of document 32 and the body of document data 33 as a set, and sets information such as storing duration under a contract in the control information document 31. In addition, the document registration processing part 1021 confirms if a user has an access authority, and if a regular storing duration has expired, performs deletion processing based on the confirmation on deleting or not of the document. In addition, the document registration processing part 1021 confirms if a user accesses a document that is temporarily stored although its regular storing duration has been expired with an additional charge, and if there is an access request, the database control part 1025 and the charge database 1092 perform the charge control processing.

Therefore, the embodiment of the present invention has the following effects that is excellent in that it is effective as a document control system for providing a document control service and as a system for supporting a more flexible and certain storing service:

(1) More certain access control is possible by embedding information such as document storing duration information in a document itself.

(2) Provision of a system (service) is possible for allowing access in the form of charging additional charge with a fixed grace period to a document whose document storing duration has been expired, rather than unconditionally disposing it.

Other Embodiment

The above-mentioned embodiment of the present invention has been described with a system in which the document control server and the plurality of clients are connected via the Internet as an example. However, the present invention is not limited to this, but may have an arbitrary communication medium as long as it can keep various electronic documents of users and provide accumulation control service, and may be applied to a system in which, for example, the document control server and the plurality of clients are connected via an network such as Integrated Services Digital Network (ISDN).

In addition, the above-mentioned embodiment of the present invention has been described with a system in which the document control server and the plurality of clients are connected via the Internet as an example. However, the present invention is not limited to this, but may have an arbitrary system configuration as long as it can keep various electronic documents of users and provide accumulation control service, and may be applied to a complex system connecting a plurality of systems in which, for example, the document control server and the plurality of clients are connected via an network such as the Internet or the ISDN.

Further, the present invention may be applied to a system comprised of a plurality of instruments or to an apparatus consisting of one machine. It goes without saying that the present invention can be achieved by supplying a storage medium storing a program code of software that realized the functions of the above-mentioned embodiment to a system or an apparatus, and the system or a computer (or a CPU or a MPU) of the apparatus reading out and executing the program code stored in the storage medium.

In this case, the program code itself read out from the storage media realizes the functions of the above-mentioned embodiment, and the storage medium storing the program code constitutes the present invention.

As a storage medium for supplying a program code, for example, a floppy disc, a hard disc, an optical disc, a magneto-optical disc, a CD-ROM, a CD-R, a magnetic tape, a nonvolatile memory card and a ROM can be used.

In addition, it goes without saying that not only the above-mentioned functions of the embodiment are realized by executing the program code read out by the computer, but also an OS and the like running on the computer performs a part or all of the actual processing based on the instruction of the program code, and the above-mentioned functions of the embodiment are realized by the processing.

Moreover, it goes without saying that, after the program code read out from the storage medium is written in a function extension board inserted in the computer or a memory provided in a function extension unit connected to the computer, a CPU and the like provided in the function extension board or the function extension unit performs a part or all of the actual processing, and the above-mentioned functions of the embodiment are realized by the processing.

As described above, since the apparatus, system and method of the embodiment of the present invention controls to store document control duration information by the unit of an electronic document when registering the document, prohibit an access from the outside to an electronic document whose document storing period has expired, update the document control period by the unit of an electronic document, embed the document control duration information in the electronic document and control it together with the body of the electronic document, and allow an access from the outside to the document whose document control duration has expired by imposing a predetermined charge, the embodiment of the present invention has the following effects that is excellent in that it is effective as a document control system for providing a document control service and as a system for supporting more flexible and certain storing service:

(1) More certain access control is possible by embedding information such as document storing period information in a document itself.

(2) Provision of a system (service) is possible for allowing access in the form of charging additional charge with a fixed grace period to a document whose document storing period has been expired, rather than unconditionally disposing it.

What is claimed is:

1. A document control apparatus for storing and controlling electronic documents accessible from an external apparatus, comprising:
   a storage device
   registering means for registering at least one electronic document to the storage device, the electronic document being transmitted from the external apparatus;
   period controlling means for storing information of a document control period of the electronic document registered by said registering means;
   keeping means for keeping the electronic document in the storage device even after the document control period of the electronic document has expired;
   access prohibiting means for prohibiting access from the external apparatus to the electronic document whose document control period has expired;
   first confirming means for confirming whether or not the document control period may be extended when the document control period has expired;
   second confirming means for confirming whether or not a user requests temporary access to the electronic document with an additional charge, when said first confirming means confirms that the control period may not be extended;
   temporary access allowing means for allowing temporary access to the electronic document whose document control period has expired when the additional charge has been confirmed for the temporary access to the electronic document, when said second confirming means confirms that the user requests the temporary access to the electronic document with the additional charge; and
   transferring means for transferring the electronic document to the external apparatus based on a user request, when said first confirming means confirms that the control period may be extended, or when said temporary access allowing means allows the temporary access to the electronic document.

2. The document control apparatus according to claim 1, further comprising:
   document processing means for updating and/or deleting the electronic document stored in the storage device; and
   document searching means for searching electronic documents stored in the storage device.

3. The document control apparatus according to claim 1, wherein said period controlling means stores the information of the document control period together with a body of the electronic document embedded in the electronic document.

4. The document control apparatus according to claim 1, wherein the electronic document comprises:
   control information of an electronic document including the information of the document control period;
   attached information of an electronic document including summary information of a document and/or index information; and a body of an electronic document transmitted from the external apparatus.

5. The document control apparatus according to claim 4, wherein the electronic document stored in the storage device comprises link information instead of the body of the electronic document, the link information indicating a location of the body of the electronic document.

6. The document control apparatus according to claim 1, wherein said keeping means keeps an electronic document that is frequently accessed from the external apparatus, and wherein said temporary access allowing means allows the temporary access to the stored electronic document based on the predetermined charge.

7. The document control apparatus according to claim 1, further comprising:
   user information storing means for storing information of registered users;
   charge information storing means for storing charge information; and
   history information storing means for storing information of electronic document access histories.

8. A document control system, comprising:
   a storage device
   a document control apparatus for storing and controlling electronic documents; and
   an external apparatus to which an access control service of said electronic document is provided from said document control apparatus,
   wherein said document control apparatus comprises:
   registering means for registering at least one electronic document to the storage device, the electronic document being transmitted from the external apparatus;
   period controlling means for storing information of a document control period of the electronic document registered by said registering means;
   keeping means for keeping the electronic document in the storage device even after the document control period of the electronic document has expired;
   access prohibiting means for prohibiting access from the external apparatus to the electronic document whose document control period has expired;
   first confirming means for confirming whether or not the document control period may be extended when the document control period has expired;
   second confirming means for confirming whether or not a user requests temporary access to the electronic document with an additional charge, when said first confirming means confirms that the control period may not be extended;
   temporary access allowing means for allowing temporary access to the electronic document whose document control period has expired when the additional charge has been confirmed for the temporary access to the electronic document, when said second confirming means confirms that the user requests the temporary access to the electronic document with the additional charge; and
   transferring means for transferring the electronic document to the external apparatus based on a user request, when said first confirming means confirms that the control period may be extended, or when said temporary access allowing means allows the temporary access to the electronic document.

9. A document control method performed in a document control apparatus for storing and controlling electronic documents accessible from an external apparatus, the method comprising:
   a storage device
   a registering step of registering at least one electronic document to the storage device, the electronic document being transmitted from the external apparatus;
   a period controlling step of storing information of a document control period of the electronic document registered in said registering step;
   a keeping step of keeping the electronic document in the storage device even after the document control period of the electronic document has expired;
   an access prohibiting step of prohibiting access from the external apparatus to the electronic document whose document control period has expired;
   a first confirming step of confirming whether or not the document control period may be extended when the document control period has expired;
   a second confirming step of confirming whether or not a user requests temporary access to the electronic document with an additional charge, when said first confirming step confirms that the control period may not be extended;
   a temporary access allowing step of allowing temporary access to the electronic document whose document control period has expired when the additional charge has been confirmed for the temporary access to the electronic document, when said second confirming step confirms that the user requests the temporary access to the electronic document with the additional charge; and
   a transferring step of transferring the electronic document to the external apparatus based on a user request, when said first confirming step confirms that the control period may be extended, or when said temporary access allowing step allows the temporary access to the electronic document.

10. The document control method according to claim 9, further comprising:
    a document processing step of updating and/or deleting the electronic document stored in the storage device; and
    a document searching step of searching electronic documents stored in the storage device.

11. The document control method according to claim 9, wherein said keeping step keeps an electronic document that is frequently accessed from the external apparatus, and wherein said temporary access allowing step allows the temporary access to the stored electronic document based on the predetermined charge.

12. The document control method according to claim 9, further comprising:
    a user information storing step of storing information of registered users;
    a charge information storing step of storing charge information; and
    a history information storing step of storing information of electronic document access histories.

13. A computer readable storage medium on which is stored on a computer-readable program for controlling a document control apparatus for storing and controlling electronic documents accessible from an external apparatus, the computer program including program codes for controlling the document control apparatus to execute:
    a storage device
    a registering step of registering at least one electronic document to the storage device, the electronic document being transmitted from the external apparatus;
    a period controlling step of storing information of a document control period of the electronic document registered in said registering step;

a keeping step of keeping the electronic document in the storage device even after the document control period of the electronic document has expired;

an access prohibiting step of prohibiting access from the external apparatus to the electronic document whose document control period has expired;

a first confirming step of confirming whether or not the document control period may be extended when the document control period has expired;

a second confirming step of confirming whether or not a user requests temporary access to the electronic document with an additional charge, when said first confirming step confirms that the control period may not be extended;

a temporary access allowing step of allowing temporary access to the electronic document whose document control period has expired when the additional charge has been confirmed for the temporary access to the electronic document, when said second confirming step confirms that the user requests the temporary access to the electronic document with the additional charge; and a transferring step of transferring the electronic document to the external apparatus based on a user request, when said first confirming step confirms that the control period may be extended, or when said temporary access allowing step allows the temporary access to the electronic document.

* * * * *